M. ZAWISTOWSKI.
CLOTH CUTTING MACHINE.
APPLICATION FILED OCT. 18, 1919.

1,338,478.

Patented Apr. 27, 1920.
2 SHEETS—SHEET 1.

WITNESSES:

INVENTOR
Martin Zawistowski
BY
ATTORNEY

M. ZAWISTOWSKI.
CLOTH CUTTING MACHINE.
APPLICATION FILED OCT. 18, 1919.

1,338,478. Patented Apr. 27, 1920.
2 SHEETS—SHEET 2.

INVENTOR
Martin Zawistowski
BY
ATTORNEY

UNITED STATES PATENT OFFICE.

MARTIN ZAWISTOWSKI, OF BROOKLYN, NEW YORK.

CLOTH-CUTTING MACHINE.

1,338,478.  Specification of Letters Patent.  Patented Apr. 27, 1920.

Application filed October 18, 1919. Serial No. 331,568.

*To all whom it may concern:*

Be it known that I, MARTIN ZAWISTOWSKI, a citizen of the United States, and a resident of Brooklyn, in the county of Kings and State of New York, have invented certain new and useful Improvements in Cloth-Cutting Machines, of which the following is a specification.

This invention is an improvement in cloth cutting machines of the rotary knife type and relates primarily to the construction, mounting and operation of the knife grinder and the knife guard. The main object of my invention is to simplify the construction and operation and reduce the cost of manufacturing and attaching these parts.

As one important feature of my invention I provide a simple device adapted to act both as a guard or guard carrier and as a grinder carrier, the device being movable to bring either the guard or the grinder into operative position and in so doing to automatically move the other out of the way. As a further important feature, I provide a single grinder member so mounted that it may be moved into operative position against either side of the edge of the cutter. As a further important feature, I provide a grinder mechanism normally supported above the knife and movable in either direction from normal and about an axis parallel to the plane of the knife, into operative position. As a further important feature, I provide a knife guard mounted to swing laterally about a pivot coincident with the plane of the knife to permit the grinder to be brought into position. As a further important feature, I provide novel means whereby the grinder and guard may be moved simultaneously, one and the other out of operative position, and whereby the parts, when released, will automatically move to a position in which the guard is in front of the cutting edge and the grinder is elevated.

A further important feature involves means for rotating the knife from a motor, having a horizontal axis, the knife itself serving to conceal the driving gear.

In the accompanying drawings I have illustrated one embodiment of my invention, but I desire this form to be considered in an illustrative rather than in a limiting sense, as various changes may be made within the scope of my invention as defined in the appended claims.

Figure 1:
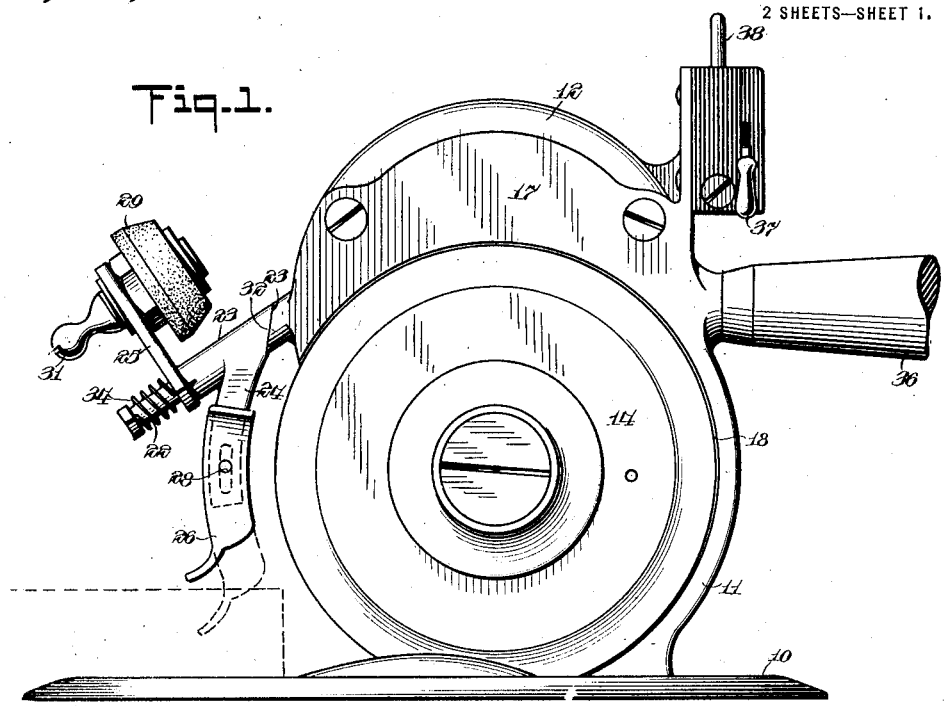
Figure 1 is an end view.

I have illustrated my invention as embodied in a cloth cutting machine having a base 10 adapted to be moved along the table or other support and beneath the material to be cut, a standard 11 and an electric motor 12 carried by said standard. I do not wish to be limited to any particular form or character of electric motor although as one important feature of my invention I have mounted the motor with the axis or drive shaft 13 horizontal and directly above and parallel to the axis of the knife or cutter 14. The end wall and a portion of the peripheral wall of the motor casing are formed integral with the standard upon which the knife is mounted. As the end wall of the motor casing carries the bearing for the armature shaft, the bearings for both the armature shaft and the knife are carried by the same integral member whereby accuracy in manufacture and rigidity in operation is secured. This rotary knife is shown as being mounted on ball bearings and held in place on the standard and rigid with a gear 15 in substantially the same way as I have illustrated and claimed in my prior patent numbered 1,319,707, issued October 28th, 1919. In my present construction the gear 15 instead of being beveled, is a straight faced gear meshing with a pinion 16 mounted on and driven by the motor shaft 13. The gear ratio is such that the motor will drive the knife, through these gears, at the desired speed and the sizes of the gears are such that the pinion 16 is entirely or substantially concealed behind the knife 14. In other words, the diameter of the pinion 16 plus the radius of the gear 15 is not materially greater than the radius of the knife. Preferably the end wall 17 of the motor which, if desired, may be formed integral with the standard 11, has a recess 18 therein receiving the knife so that the wall of the recess constitutes a fixed guard for all of the upper and rear portions of the cutting edge leaving only the front edge exposed as shown particularly in Fig. 1.

The gear is preferably formed rigid or integral with a sleeve or collar slidable upon the motor shaft 13. This sleeve or collar is mounted in a ball bearing 20 in the end wall 17 of the motor and is held against relative rotation in respect to the motor shaft by a pin and socket 21 or other suitable form of keyway. This permits the removal of the motor and its armature from the end wall 17 without disturbing the gear 16.

As previously indicated one of the main features of my invention involves the guard and grinder and means for mounting and operating them. As shown, the motor casing or the frame of the machines has a forwardly extending stud or pivot pin 22 in, or substantially in, the plane of the knife and preferably, although not necessarily, downwardly inclined. Mounted for oscillation on this stud or pivot pin is a device serving as a combined guard or guard carrier and grinder carrier. This device as illustrated includes a sleeve 23 mounted for oscillation on the pivot pin and having two arms 24 and 25 rigid or integral therewith and projecting in opposite directions therefrom. The arm 24 may itself serve as a guard and may be curved or otherwise formed so as to fairly closely follow the contour of the cutting edge of the knife but spaced a short distance in front of the latter. If it is desired that the guard be of variable or adjustable length, the arm 24 is provided with a guard section 26 slidable lengthwise of the arm or guard section 24 and adapted to be rigidly secured thereto in any desired adjusted position. As shown, the guard section 26 has a flange 27 adapted to engage with one edge of the guard section 24 and the latter has a slot through which a clamp bolt or screw 28 extends. By loosening this screw the guard may be lengthened or shortened as indicated in solid and dotted lines in Fig. 1.

The grinder carrier 25 is illustrated as supporting a single grinder-wheel 29, having its axis approximately parallel to the plane of the knife and projecting from the carrier 25 toward the knife. To permit the proper engagement of the grinder with knives of varying sizes or after the knife has worn down and become smaller the grinder is adjustable along the carrier. As shown, the arm 25 is provided with a slot 30 through which the axle for the grinder extends. Threaded on the end of this axle is a combined handle and nut 31. By loosening this nut the grinder may be adjusted lengthwise of the arm 25. The tightening of the nut holds the grinder in any desired position but leaves it free to rotate about its axis as is common in sharpeners for cloth cutting machines. The nut 31 serves as a knob whereby the grinder may be moved bodily and the sleeve 23 rotated on the pivot pin 22.

Figure 2:
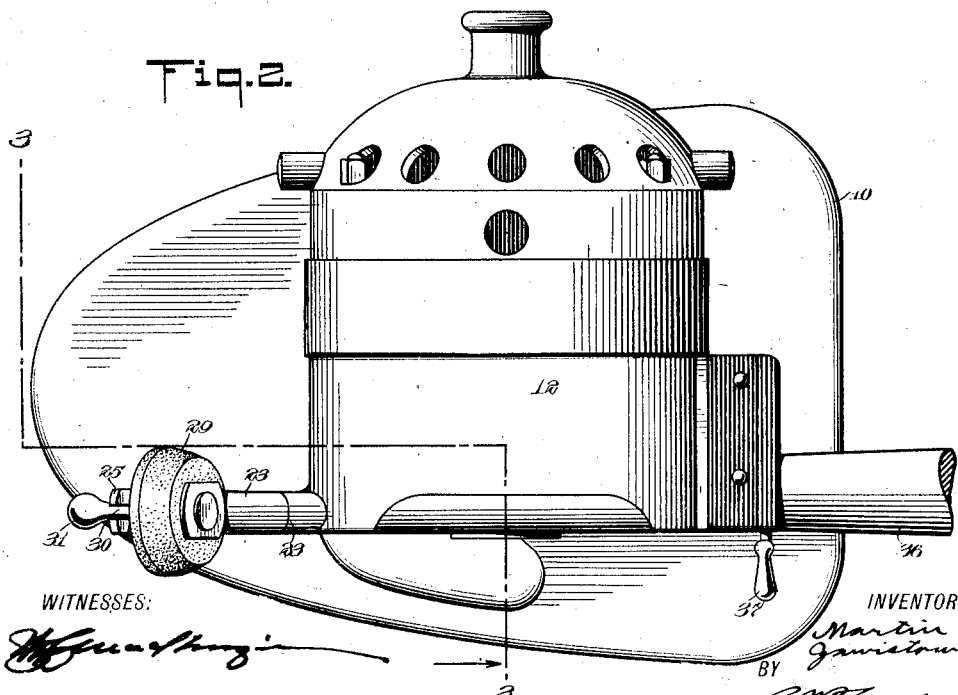
Fig. 2 is a top plan view.
Figure 3:
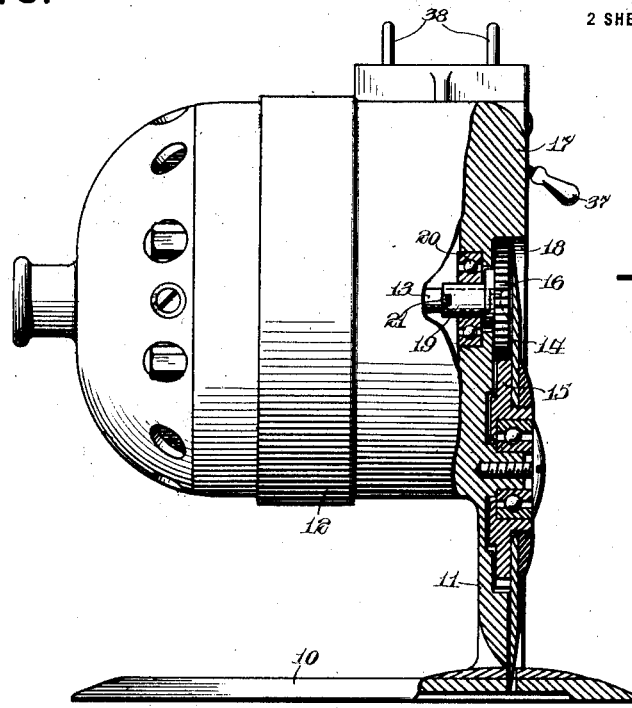
Fig. 3 is a front view, a portion being shown in section on the line 3—3 of Fig. 2.
Figure 4:
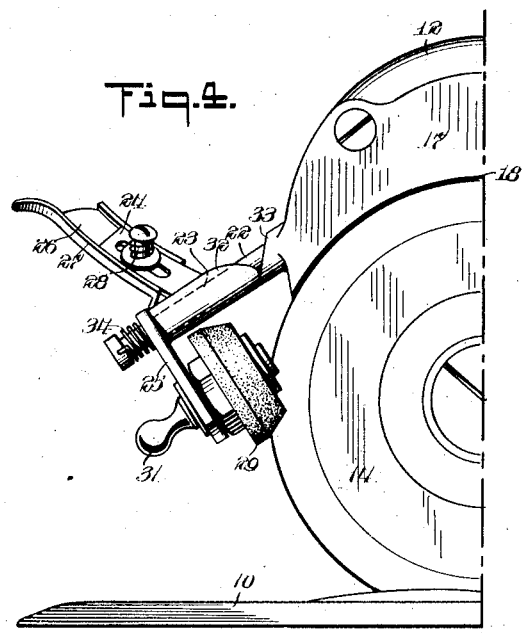
Fig. 4 is a view similar to a portion of Fig. 1, but showing the grinder in operative position against one side of the edge of the knife.
Figure 5:
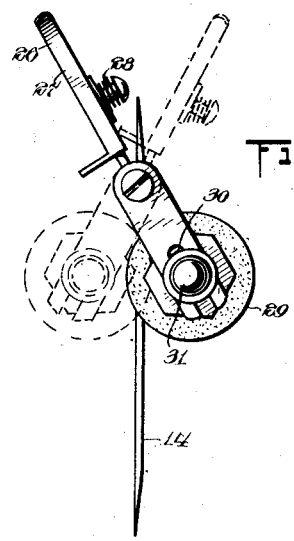
Fig. 5 is a front view of the grinder and guard, the parts being shown in solid lines with the grinder against one side of the knife and in dotted lines with the grinder against the other side.

Preferably means are provided whereby the grinder and guard carrier on the pivot pin 22 normally tend to remain in or return to the position shown in Figs. 1 and 2. Merely as one form of such means I have shown the sleeve 23 provided with a beveled end 32 for coöperation with a beveled stop or shoulder 33 on the frame or pivot pin 22. I have also shown a coiled spring 34 encircling the pivot pin and having one end connected to the carrier and the other to the pivot. Either the spring or the bevel or both may be relied upon. With an ordinary compression spring the tendency of the grinder and guard carrier is to move toward the right from the position indicated in Fig. 4 and by reason of the bevel this movement will result in a rotation of the device to the position shown in Fig. 1. Even without a bevel, the spring with both ends secured, as indicated, may be of such strength and size that there is no rotary tendency when the parts are in the normal position as shown in Fig. 1, but upon rotating the sleeve 23 in either direction the spring will be put under torsion stress by coiling or uncoiling and will tend to return the parts to the initial position with the spring neutral. The shape of the abutting ends 32 and 33 may be such that there is no tendency for the parts to return to normal position but interengaging notches will hold the parts in any position when they are manually moved to it. The knob 31 may serve as a handle and may be easily grasped to swing the grinder from a normal position around to engagement with one side of the knife as shown in solid lines in Fig. 5 or around in the opposite direction into engagement into the other side of the knife as indicated in dotted lines in Fig. 5. As the guard or guard carrier is rigid or integral with the grinder carrier the swinging movement of the grinder toward the cutting edge for sharpening the parts automatically moves the guard out of the way. Likewise the return of the grinder to its normal rest position returns the guard to operative position adjacent to the cutting edge.

It will, of course, be understood that the sharpening of the knife ordinarily takes place while the knife is being rotated by the motor and that the grinder stone engages with the cutting edge in such a way that the stone is rotating by this engagement with the knife and in such a way as to have a sharpening action. The machine in connection with which I have illustrated my invention may be propelled in the usual manner by a handle 36 and adjacent to this may be a simple form of switch 37 for controlling the flow of current to the motor. The switch box is shown as having terminals 38 to which a plug on the conductor wires may be secured. The machine may also have the usual or any form of lamp carried by the casing for illuminating the portion of the goods directly in advance of the knife.

Having thus described my invention what I claim as new and desire to secure by Letters Patent is

1. A cloth cutting machine having a rotary knife and a knife guard disposed in advance of the cutting edge and mounted to swing laterally in either direction from the normal position and about an axis parallel to the plane of the knife.

2. A cloth cutting machine having a rotary knife, a knife guard, a knife grinder and an oscillatory member bodily carrying said guard and grinder and movable in opposite directions from normal position to bring said guard and grinder alternately into operative position.

3. A cloth cutting machine having a rotary knife, a member mounted for oscillation about an axis substantially parallel to the plane of the knife, a guard carrier projecting in one direction therefrom and a grinder carrier projecting in the opposite direction therefrom.

4. A cloth cutting machine having a knife guard and a knife sharpener mounted to swing about the same axis and alternately into operative position.

5. A cloth cutting machine having a rotary knife, a member mounted to oscillate about an axis coincident with the plane of the knife and above the latter and a knife guard and a knife sharpener, both carried by said member and extending in opposite directions from said axis.

6. A cloth cutting machine having a knife, a member mounted to oscillate about an axis coincident with the plane of the knife and above the latter, a knife guard and a knife sharpener, both carried by said member and means normally tending to hold said device with the guard in operative position and the knife sharpener in inoperative position.

7. A cloth cutting machine having a knife, a knife guard and a knife sharpener mounted to oscillate about an axis coincident with the plane of the knife and above the latter, and means normally tending to hold said device with the guard in operative position and the knife sharpener in inoperative position.

8. A cloth cutting machine having a knife, a pivot pin projecting forwardly above said knife, a sleeve mounted for oscillation on said pivot pin, a grinder carried by said sleeve and a knife guard carried by said sleeve, said grinder and guard being disposed on opposite sides of the axis of the sleeve.

9. A cloth cutting machine, a member mounted for oscillation about a forwardly projecting axis, a grinder carried by said member and a knife guard carried by said member, said grinder and said guard being upon opposite sides of said axis and adjustable toward and from said member.

10. A cloth cutting machine, a pivot pin projecting forwardly above the knife, a sleeve mounted for oscillation on said pivot pin, a grinder carried by said sleeve and a knife guard carried by said sleeve, said guard being adjustable toward and from said sleeve.

11. A cloth cutting machine having a knife, a pivot projecting forwardly above said knife, a sleeve mounted for oscillation on said pivot, a grinder carried by said sleeve and a knife guard carried by said sleeve, said grinder being adjustable toward and from said sleeve.

12. A cloth cutting machine having a rotary knife, a sleeve mounted for oscillation, an arm carried by said sleeve, a grinder secured to said arm and adjustable lengthwise to the latter, said grinder being movable into engagement with either side of said knife upon the oscillation of said sleeve.

13. A cloth cutting machine having a rotary knife, a member mounted for oscillation and having an arm provided with a slot extending lengthwise thereof, a grinder adjustable lengthwise of said slot and a member for holding said grinder in adjusting position and serving as a handle for the oscillation of said first mentioned member.

14. A cloth cutting machine having a pivot pin projecting forwardly, a sleeve mounted for oscillation thereon and presenting a cam at one end thereof for forcing said sleeve axially upon the rotation of said sleeve, a spring tending to prevent said axial movement and a grinder carried rigid with said sleeve and normally projecting upwardly therefrom.

15. A cloth cutting machine having an electric motor with a substantial horizontal shaft, a sleeve slidably mounted on said shaft but held against rotation in respect thereto, a standard for supporting said motor, a bearing for directly supporting said sleeve from said standard, said shaft being supported by said sleeve, a pinion on the outer end of said sleeve and a rotary knife having a gear coaxial therewith and meshing with said pinion.

16. A cloth cutting machine having a standard, a rotary knife mounted thereon and having a gear rigid therewith, an electric motor supported by said standard and having a horizontal armature shaft disposed below the upper edge of said knife and parallel to the axis of the latter, and a pinion coaxial with said shaft and driven thereby in direct meshing engagement with said gear and disposed below the upper edge of said knife and concealed by the latter.

17. A cloth cutting machine having a standard, a rotary knife mounted thereon, an electric motor having a horizontal armature and a casing therefor, and a pair of intermeshing gears directly connected to said knife and armature shaft, said standard and the end wall of said casing being formed integral whereby the axis of the knife and the axis of the shaft are in predetermined and fixed relationship to each other.

Signed at New York city, in the county of New York and State of New York this 17th day of October, A. D. 1919.

MARTIN ZAWISTOWSKI.